United States Patent [19]

Vassalotti

[11] Patent Number: 4,846,444
[45] Date of Patent: Jul. 11, 1989

[54] STUD TENSIONING AND TIGHETNING APPARATUS

[76] Inventor: Michael Vassalotti, 635 National Hwy., LaVale, Md. 21502

[21] Appl. No.: 215,344
[22] Filed: Jul. 5, 1988
[51] Int. Cl.$^4$ ............................................. E21B 19/00
[52] U.S. Cl. ................................................. 254/29 A
[58] Field of Search ................. 254/29 A, 452; 81/57, 81/38

[56] References Cited
U.S. PATENT DOCUMENTS 4,569,506 2/1986 Vassalotti ........................ 254/29 A
4,708,036 11/1987 Vossbrinck ........................ 81/57.38

Primary Examiner—Robert C. Watson
Attorney, Agent, or Firm—Charles J. Brown

[57] ABSTRACT

Tensioning and tightening apparatus for a conventional stud and nut wherein a piston and cylinder pair defining a pressure chamber are disposed beyond the end of the stud rather than in the form of an annulus around the stud and the tensioning force is transmitted by tension-bearing members extending through the piston and cylinder pair to a puller attached to the stud but not through the pressure chamber.

12 Claims, 3 Drawing Sheets

STUD TENSIONING AND TIGHETNING APPARATUS

BACKGROUND OF THE INVENTION

Hydraulic stud tensioning and tightening devices are widely employed for applying a pre-determined axial load directly to a stud causing it to stretch and then be secured by a threaded nut in that tensioned condition. Conventional hydraulic stud tensioning and tightening devices are generally divided into two categories, both of which have disadvantages overcome by the present invention.

The first category of conventional stud tensioning and tightening devices comprises those wherein a piston and cylinder define a hydraulic pressure chamber which is annular and concentrically disposed around the stud. When the chamber is pressurized and the piston and cylinder move apart a load is applied to a so-called puller threaded onto the stud above its nut, thereby causing the stud to be stretched. A significant disadvantage of those designs is that the annular pressure chamber around the stud requires a measurable amount of free space and hence the outer diameter of the annular pressure chamber is often limited by proximity to adjacent studs on either side of the one being tensioned. Sometimes it is therefore necessary to tension only every other stud rather than all of them because of the space requirements of prior art devices. The inner diameter of the annular pressure chamber is of course limited by the necessary thickness of the wall of the cylinder which itself must surround the stud. Therefore the effective hydraulic working area of those stud tensioning and tightening devices which define an annular pressure chamber around the stud is limited and that is turn directly limits their loading capability.

The second category of prior art stud tensioning and tightening devices is those which depart entirely from conventional studs or nuts and resort instead to special designs. Examples are the devices described in U.S. Pat. Nos. 4,120,230 and 3,835,523 wherein the conventional stud is replaced by one with a special inner bore and the conventional nut is replaced by a unique element on the special stud. While the pressure chamber is circular and disposed beyond the end of the special stud and nut in both those designs, they apply the load to the stud by pushing on a compression column extending axially into a bore in the stud. It is self-evident that designs of tensioning and tightening devices which cannot be used with conventional studs and nuts are expensive and find little favor in nuclear, military and naval equipment where great reliance is placed upon standard and proven stud and nut design.

It is the principle purpose of the present invention to provide an improved stud tensioning and tightening apparatus which avoids the shortcomings of both categories of prior art designs described above. The apparatus of the invention avoids the use of an annular pressure chamber around the outside of the stud and instead places the pressure chamber coaxially beyond the outer end of the stud where it can be made circular rather than annular. This results in a much larger hydraulic working surface and increases the load-bearing capacity of a given form of the apparatus which might otherwise be limited by proximity to the studs and nuts on either side. It also makes possible the tensioning of all studs rather than every other one. The invention also constitutes an improvement over the second category of conventional designs in that it requires no change whatever in the standard configuration of studs and nuts. Not only can a given form of the invention be used to tension and tighten a standard stud and nut but with a simple change of parts a given form of the invention can be used for standard studs and nuts of different sizes.

There are other advantages of the invention as will become apparent from the following description.

BRIEF DESCRIPTION OF THE INVENTION

The invention provides tensioning and tightening apparatus for a stud projecting from an opening in a surface through and beyond a closure nut threaded thereto. The apparatus includes a puller adapted to be screwed onto the stud beyond the nut. A spacer sleeve is coaxial with and surrounds the puller and is adapted to abut the surface around the opening. Coaxial with the sleeve at that end thereof remote from the surface is a telescoping piston and cylinder pair which together define a pressure chamber. One of this piston and cylinder pair is remote from and the other is adjacent to the end of the sleeve. Tension-bearing members connect and prevent movement apart of the puller and that one of the piston and cylinder pair which is remote from the sleeve. The tension-bearing members extend slideably through corresponding holes in that other of the pair which is adjacent the sleeve but do not extend through the pressure chamber. Pressurizing means are included for forcing the piston and cylinder apart to tension the stud. Access means in the spacer sleeve permit the nut to be screwed down on the tensioned stud into contact with the surface. Biasing means are provided for moving the piston and cylinder together when the chamber is depressurized.

In a preferred form the spacer sleeve is longer than the length of the stud projecting from the surface. The cylinder is preferably adjacent the sleeve and the piston is remote from the sleeve. The tension-bearing members are preferably rods, and it is preferred that they be equally spaced around a circle larger in diameter than the circular cross section of the pressure chamber. In the preferred form the biasing means are springs, particularly compression springs around the respective tensioning rods which act between the puller and the piston and cylinder pair. The pressure chamber is preferably circular in cross section and has a diameter greater than that of the stud. The movement apart of the piston and cylinder during pressurization can be limited by contact between the puller and that one of the piston and cylinder pair adjacent the end of the sleeve, thereby permitting pressure testing of the apparatus without assembly to the stud. The sleeve and that one of the cylinder and piston adjacent the sleeve are preferably two separate interconnected parts.

DESCRIPTION OF PREFERRED EMBODIMENT

It is to be made clear at the outset that the accompanying drawings are not to scale, particularly in regard to the total sectional area of the tension-bearing members as compared to the cross sectional area of the stud being tensioned. The significance of this is explained below.

Figure 1:
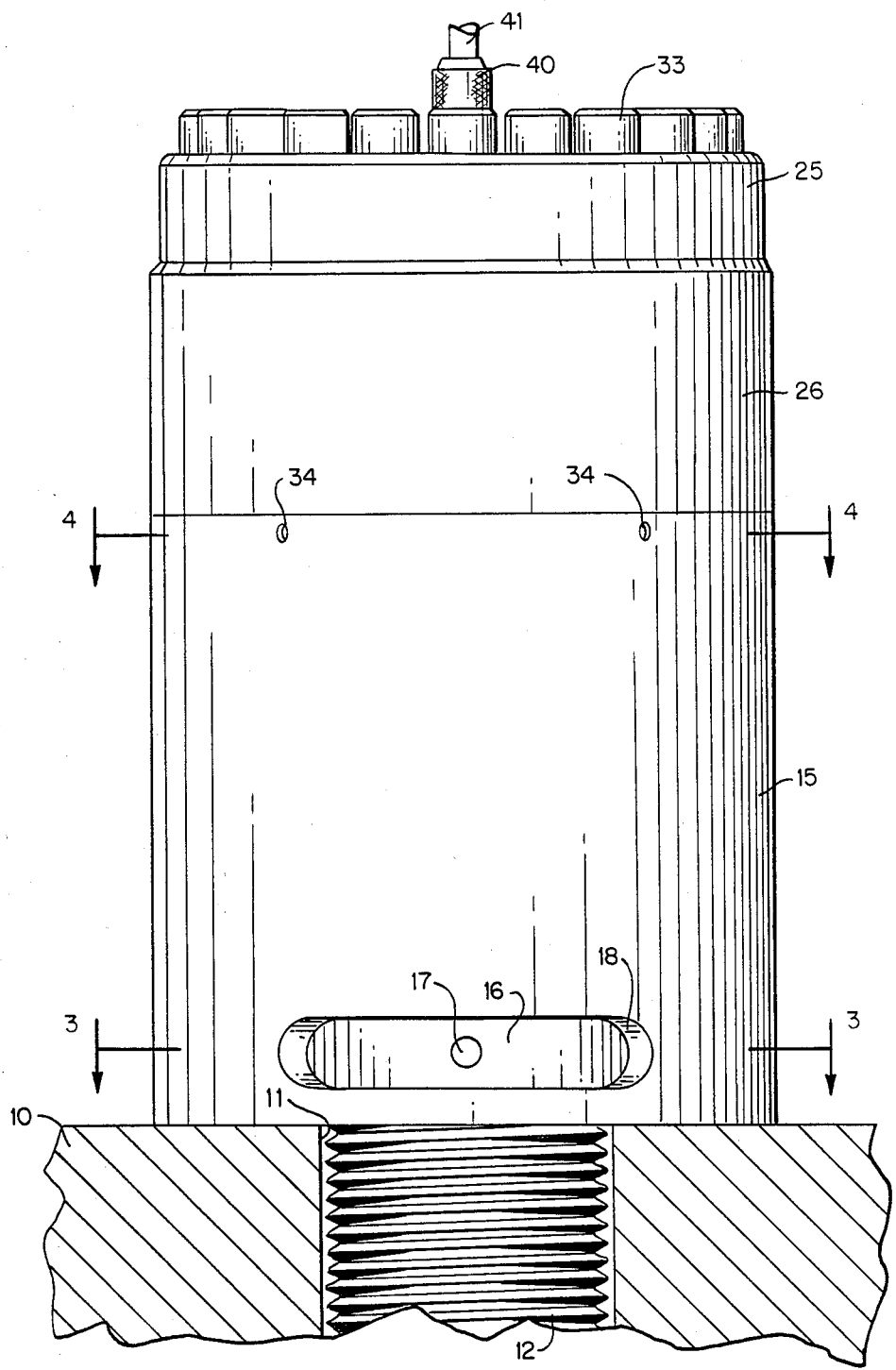
FIG. 1 is a side elevation of the assembly located on a surface through which the stud to be tensioned and tightened projects.
Figure 2:
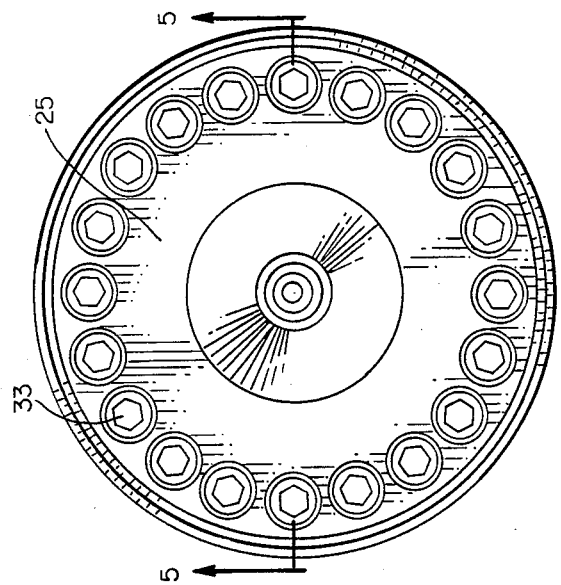
FIG. 2 is a top plan view of the apparatus of FIG. 1.
Figure 7:
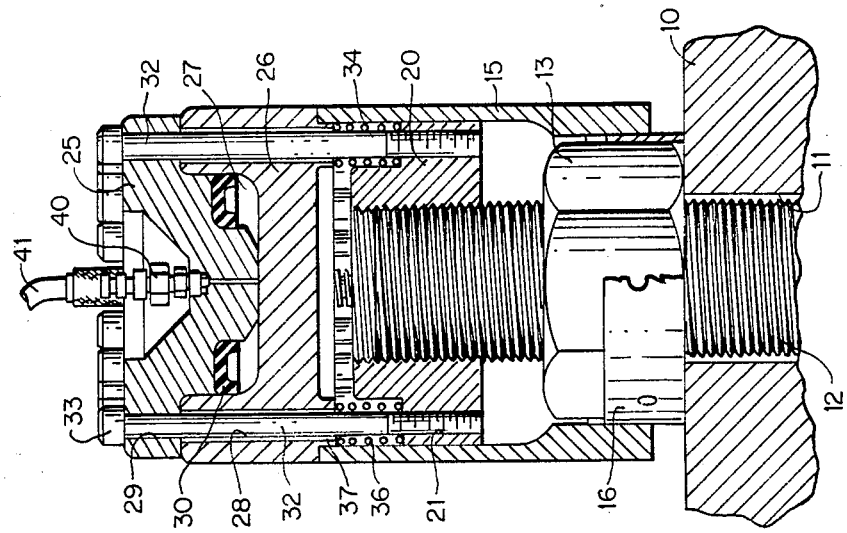
FIG. 7 is a section similar to that of FIGS. 5 and 6 showing the apparatus after the pressure chamber has been depressurized and the nut has been screwed down on the tensioned stud.
Figure 6:
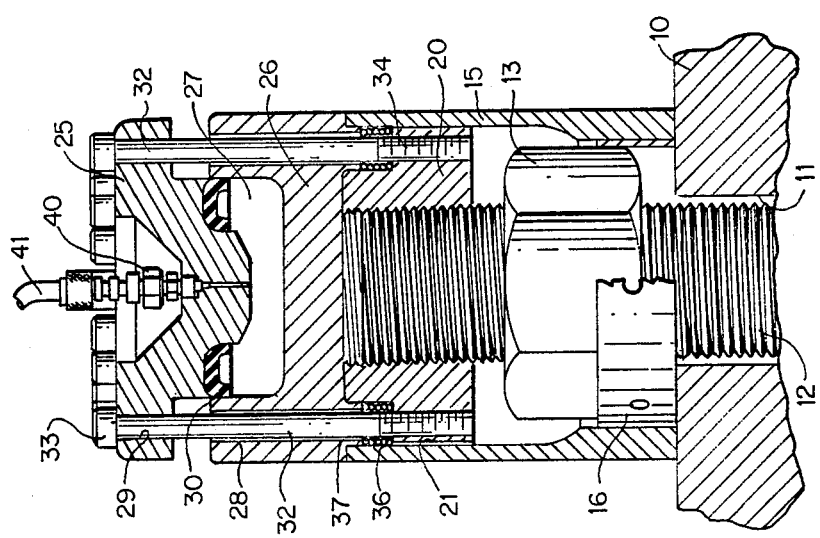
FIG. 6 is a section similar to that of FIG. 5 showing the apparatus after the pressure chamber has been pressurized and the stud has been tensioned.
Figure 5:
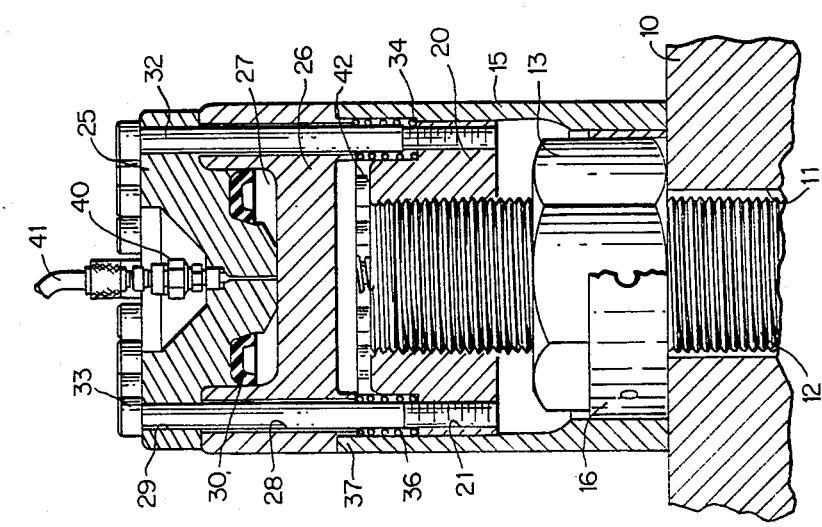
FIG. 5 is a longitudinal section taken along the line 5—5 of FIG. 2 showing the apparatus attached to the projecting stud prior to operation.

Referring first to FIGS. 1 and 2 the apparatus of the invention rests upon a foundation surface 10 in which an opening 11 is formed and through that opening a conventional threaded stud 12 extends. A conventional nut 13, visible in FIGS. 3 and 5 to 7, is threaded onto the projecting end of the stud 12 and the stud end portion projects above the nut as seen in FIGS. 5 to 7. For purposes of this invention the projecting end portion need not be more than approxiamately three quarters of a diameter to one full diameter. The object of the invention is to provide apparatus which applies a pre-determined axial stretching load to the stud 12 to allow the nut 13 to be threaded down into the surface 10 when the nut 12 has been tensioned and stretched.

Figure 3:
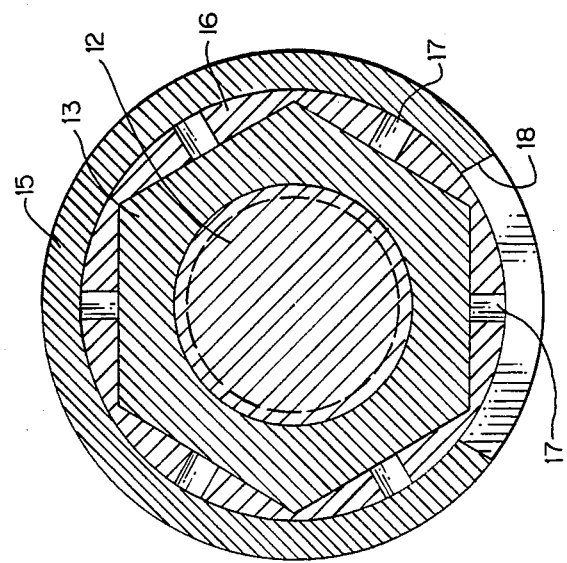
FIG. 3 is a lateral section taken along the line 3—3 of FIG. 1.

The apparatus includes a spacer sleeve 15 of generally cylindrical shape surrounding the nut 13. It is sufficiently long that it extends above the upper end of the projecting stud 12. Within the spacer sleeve 15 is a rotating socket 16 of conventional design, which is to say having a hexagonal interior cross section as shown in FIG. 3 to fit around the nut 13 and having six radial holes 17 adapted to receive a detachable turning bar which is not shown in the drawings. The apparatus may be used with different sizes of nuts and studs simply by replacing the socket 16 with another of appropriate interior cross section. An aperture 18 is provided in the lower portion of the sleeve 15 to receive the turning bar.

Screwed onto the upper end of the stud 12 above the nut 13 is a puller 20. In a circle about the upper periphery of the puller are twenty threaded holes 21. The spacer 15 surrounds the puller 20.

Coaxial with the sleeve 20 at that upper end thereof remote from the surface 10 is a telescoping piston and cylinder pair comprising an upper piston 25 and a lower cylinder 26. Together the piston 25 and cylinder 26 define a pressure chamber 27 of circular cross section larger in diameter than the diameter of the stud 12. Formed in the wall of the cylinder 26 are twenty holes 28 corresponding substantially in size and location to the twenty threaded holes 21 in the puller 20. There are also twenty holes 29 in an upper flange of a piston 25 which substantially correspond in size and location to the holes 28 and 21. A seal 30 in the pressure chamber 27 prevents leakage between the piston 25 and cylinder 26 during pressurization.

Twenty tension-bearing rods 32 extend through the respective twenty aligned holes 29, 28, 21. At the upper end of each rod 32 is a cap 33 and at the lower end thereof is a threaded portion 34 for attachment in the threaded holes 21 of the puller 20. These tension-bearing rods 30 are therefore equally spaced around a circle larger in diameter than that of the circular cross section of the pressure chamber 27 and they connect and prevent movement apart of the puller 20 and the piston 25. They do not pass through the pressure chamber 27.

Closely surrounding the rods 32 are respective helical compression springs 36 which act between a lower flange 37 on the cylinder 26 which fits into the upper edge portion of the sleeve 15. It is the function of the springs 36 to bias the cylinder 26 upwardly against the underside of the piston 25 to the position shown in FIG. 5 when the chamber 27 in not pressurized.

Figure 4:
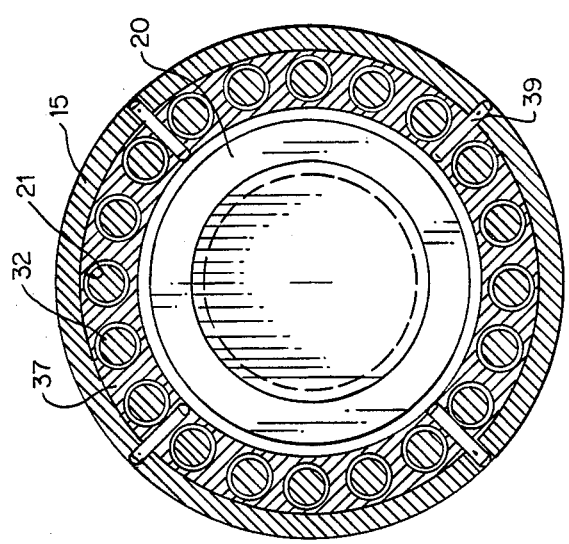
FIG. 4 is a lateral section taken along the line 4—4 of FIG. 1.

There are four connecting dowels 39 shown in FIG. 4 which extend through registered lateral holes in the upper edge portion of the sleeve 15 and the above-mentioned flange 37 on the cylinder 26. It is the purpose of the dowels 39 to hold the sleeve 15 and the cylinder 26 together at all times during operation but to permit them to be taken apart for purposes of assembly with the other elements.

Pressure is applied to the pressure chamber 27 by means of a male hydraulic quick-connect coupling 40 which communicates through a hose 41 with a properly valved hydraulic pressure source.

Before the operation of the apparatus is described it is to be noted that pressure testing of the chamber 27 and the seal 30 can be carried out whether or not the apparatus is assembled to the stud 12 and nut 13. If pressure is applied to the chamber 27 through the coupling 40 and the holes 41 it causes the cylinder 26 to be forced against the compression springs 36 away from the piston 25 into contact with an upper surface 42 of the puller 20. This is generally the position of the cylinder 26 and puller 20 shown in FIG. 6, though during such a test the puller 20 would not be threaded onto the stud 12. The pressure can then be increased in the chamber 27 to whatever testing level is desired.

In the operation of the apparatus the socket 16 is first placed around the nut 13 in the position shown in FIG. 5 and the coupling 40 and hose 41 are not yet attached to the piston 25. The entire remainder of the apparatus is then lowered over the stud 12 and is rotated so that the puller 20 screws down onto the stud 12. This is continued until the sleeve 15 abuts against the surface 10. Without pressure in the chamber 27 the springs 36 urge the cylinder 26 upwardly into abutment against the underside of the piston 25.

The next step is to attach the coupling 40 and hose 41 and apply hydraulic pressure to the chamber 27. This forces the piston 25 upwardly off the upper end of the cylinder 26 and applies the tension load to all of the rods 28. Since the rods 28 are secured at their lower threaded ends to the puller 20 this load is transmitted through the puller to the stud 12. Under the desired degree of pressure the stud 12 stretches and thus the surface 42 of the puller 20 moves toward the underside of the cylinder 26. At the same time the nut 13 is lifted off of the surface 10 as shown in FIG. 6. It is to be noted that this stretching of the stud 12 will not in most cases carry the puller 20 fully up against the underside of the piston 26 as shown in FIG. 6, but such full contact is shown for purposes of illustration.

The operator then inserts a turning bar (not shown) through the aperture 18 at the lower end of the sleeve 15 and into one of the holes 17 in the socket 16. In incremental fashion the socket 16 can then be rotated to turn the nut 13 downwardly into abutment with the surface 10 as shown in FIG. 7. Pressure in the chamber 27 may then be released and the stretched stud under tension remains held in place by the nut 13 in engagement with the surface 10. This release of pressure also causes the compression springs 36 to urge the cylinder 26 upwardly against the underside of the piston 25 back into the relative position shown in FIG. 5, but since the stud 12 is now stretched this causes a gap to open between the bottom of the sleeve 15 and the surface 10 as shown in FIG. 7. The entire apparatus may then be rotated so that the puller 20 is threaded off the stud 12, leaving behind only the tensioned and tightened stud with its nut 13 in place.

It will be apparent that all of this can be carried out by a device of minimum diameter which fits closely around the stud and nut 13. Unlike prior art devices which employ an annular pressure chamber surrounding the stud, the apparatus of the invention requires very little space in relation to the adjacent studs and nuts to either side. All studs in a circle rather than every other stud can be tensioned.

Reference was made earlier to the fact that the drawings are not to scale and particularly in regard to the total cross sectional area of the rods 32 in relation to the total cross sectional area of the stud 12. It will be appreciated that the force applied through the rods 32 to tension the stud 12 should not be so great as to stretch the rods 32 before the desired stretch is imparted to the stud 12. If both the stud 12 and the rods 32 are of a material having equal tensile strength, it would be appropriate to configure the apparatus so that the total cross sectional area of the rods 32 is measurably greater than the cross sectional area of the stud 12. The stud would then undergo strain to a greater extent than would the rods. The stroke of the piston in the cylinder can be increased to offset this strain or the diameters of the sleeve 15, the cylinder 26 and the piston 25 can be increased to permit an enlargement of the diameter of the rods 32. Tension-bearing members other than rods of circular cross section can also be employed. For example, with reference to FIG. 4, the middle three rods between each pair of the dowels 39 could be eliminated and in their place an arcuate cylinder section could extend through a similarly configured arcuate hole from the upper piston 25 down to the puller 20. This would necessitate different means of attachment to the puller 20 other than a threaded end as with the rods 32, but such variation would be a simple matter of engineering design.

Tension on the studs can be relieved and the nuts removed simply by reversing the above steps.

It will also be apparent that certain reversal of parts can readily be made. For example the cylinder 26 can be uppermost with the piston 25 moving between it and the puller 20. Similarly the rods 32 can be threaded into the cylinder with the caps 33 at their lower end rather than the reverse of that arrangement shown above.

The scope of the invention is therefore not to be taken from the specific embodiment described above but rather from the claims set forth below.

I claim:

1. Tensioning and tightening apparatus for a stud projecting from an opening in a surface through and beyond a closure nut threaded thereto comprising
   (a) a puller adapted to be screwed onto the stud beyond the nut,
   (b) a spacer sleeve coaxial with and surrounding the puller and adapted to abut said surface around the opening,
   (c) a telescoping piston and cylinder pair coaxial with the sleeve at that end thereof remote from said surface and together defining a pressure chamber through which the stud axis extends,
   (d) one of said piston and cylinder pair being remote from and the other being adjacent to said end of the sleeve,
   (e) a plurality of tension-bearing members connecting and preventing movement apart of the puller and that one of the piston and cylinder pair which is remote from the sleeve and extending slideably through corresponding holes in that other of the pair which is adjacent the sleeve but not extending through the pressure chamber,
   (f) pressurizing means for forcing the piston and cylinder apart to tension the stud,
   (g) access means in the spacer sleeve permitting the nut to be screwed down on the tensioned stud into contact with the surface, and
   (h) biasing means for moving the piston and cylinder together when the chamber is depressurized.

2. Tensioning and tightening apparatus according to claim 1 wherein the spacer sleeve is longer than the length of the stud projecting from said surface.

3. Tensioning and tightening apparatus according to claim 1 wherein the cylinder is adjacent the sleeve and the piston is remote from the sleeve.

4. Tensioning and tightening apparatus according to claim 1 wherein the biasing means are springs.

5. Tensioning and tightening apparatus according to claim 1 wherein the tension-bearing members are rods.

6. Tensioning and tightening apparatus according to claim 5 wherein the rods are equally spaced around a circle larger in diameter than the cross section of the pressure chamber.

7. Tensioning and tightening apparatus according to claim 1 wherein the pressure chamber is circular in cross section.

8. Tensioning and tightening apparatus according to claim 7 wherein the circular cross section of the pressure chamber has a diameter greater than that of the stud.

9. Tensioning and tightening apparatus according to claim 1 wherein the movement apart of the piston and cylinder during pressurization is limited by contact between the puller and that one of the piston and cylinder pair adjacent the end of the sleeve, thereby permitting pressure testing of the apparatus without assembly to the stud.

10. Tensioning and tightening apparatus according to claim 1 wherein the sleeve and that one of the cylinder and piston adjacent the sleeve are two separate interconnected parts.

11. Tensioning and tightening apparatus for a stud projecting from an opening in a surface through and beyond a closure nut threaded thereto comprising
    (a) a puller adapted to be screwed onto the stud beyond the nut,
    (b) a spacer sleeve coaxial with and surrounding the puller and adapted to abut said surface around an opening and being longer than the length of the stud projecting therefrom,
    (c) a telescoping piston and cylinder pair coaxial with the sleeve at that end thereof remote from said surface and together defining a pressure chamber of circular cross section larger in diameter than that of the stud,
    (d) the cylinder of the piston and cylinder pair being adjacent the sleeve and the piston of the pair being remote from the sleeve, (e) tension-bearing rods equally spaced around a circle larger in diameter than that of the circular cross section of the pressure chamber and connecting and preventing movement apart of the puller and the piston and extending slideably through corresponding holes in the cylnder but not through the pressure chamber, (f) pressurizing means for forcing the piston and cylinder apart to tension the stud, (g) the movement apart of the piston and cylinder being limited by contact between the puller and the cylinder thereby permitting pressure testing of the apparatus without assembly to the stud, (h) access means in the spacer sleeve permitting the nut to be screwed down on the tensioned stud into contact with the surface, and (i) compression springs around the respective rods and acting between the puller and the cylinder for moving the piston and cylinder together when the chamber is depressurized.

12. Tensioning and tightening apparatus for a stud projecting from an opening in a surface through and beyond a closure nut threaded thereto comprising (a) a puller adapted to be screwed onto the stud beyond the nut, (b) a spacer sleeve coaxial with and surrounding the puller and adapted to abut said surface around the opening, (c) a telescoping piston and cylinder pair coaxial with the sleeve at that end thereof remote from said surface and together defining a pressure chamber, (d) one of said piston and cylinder pair being remote from and the other being adjacent to said end of the sleeve, (e) tension-bearing members connecting and preventing movement apart of the puller and that one of the piston and cylinder pair which is remote from the sleeve and extending slideably through corresponding holes in that other of the pair which is adjacent the sleeve but not extending through the pressure chamber, (f) pressurizing means for forcing the piston and cylinder apart to tension the stud, (g) access means in the spacer sleeve permitting the nut to be screwed down on the tensioned stud into contact with the surface, and (h) compression springs around the respective tensioning rods and acting between the puller and the piston and cylinder pair for moving the piston and cylinder together when the chamber is depressurized.

* * * * *